United States Patent [19]

Okuda

[11] Patent Number: 5,070,839

[45] Date of Patent: Dec. 10, 1991

[54] IGNITION TIMING CONTROL APPARATUS FOR A MARINE ENGINE

[75] Inventor: Hiroshi Okuda, Himeji, Japan

[73] Assignee: Mitsubishi Denki Kabushiki Kaisha, Tokyo, Japan

[21] Appl. No.: 627,116

[22] Filed: Dec. 13, 1990

[30] Foreign Application Priority Data

Oct. 3, 1988 [JP] Japan .................. 63-247448

[51] Int. Cl.⁵ .................. F02P 1/08; F02P 3/08; F02P 5/15
[52] U.S. Cl. .................. 123/416; 123/418; 123/425; 123/602
[58] Field of Search .............. 123/198 DC, 335, 418, 123/416, 425, 602, 604, 605, 599, 596, 179 BG

[56] References Cited

U.S. PATENT DOCUMENTS

| | | | |
|---|---|---|---|
| 4,204,490 | 5/1980 | Ohki et al. | 123/335 |
| 4,572,150 | 2/1986 | Foster | 123/335 X |
| 4,594,978 | 6/1986 | Kanno | 123/335 |
| 4,599,982 | 7/1986 | Sugiura | 123/425 |
| 4,641,618 | 2/1987 | Dogadko et al. | 123/335 |
| 4,938,189 | 7/1990 | Morita et al. | 123/335 |
| 4,993,371 | 2/1991 | McDougal et al. | 123/425 |

FOREIGN PATENT DOCUMENTS 0039793 9/1978 Japan .
0092354 7/1981 Japan .
0012944 4/1985 Japan .

Primary Examiner—Willis R. Wolfe
Attorney, Agent, or Firm—Sughrue, Mion, Zinn, Macpeak and Seas

[57] ABSTRACT

An improved ignition control apparatus for a marine engine capable of improving the startability and the idling property at low speeds of the engine. An ignition coil is connected to a spark plug for a cylinder, and a generator coil supplies a current to the ignition coil. A switch element operates to switch on and off the conduction between the power supply means and the ignition coil so as to develop a high voltage on the ignition coil. An ignition timing controller controls the switch element so as to properly change the ignition timing of the cylinder depending upon the operating condition of the engine. The controller retards the ignition timing from a reference ignition timing suitable for engine starting to a first retard ignition timing suitable for normal and stable engine operation by a prescribed extent when the number of revolutions per minute of the engine exceeds a predetermined level. Further, if knocking takes place in the cylinder, the controller retards the ignition timing to a second retard ignition timing which retards from the first retard ignition timing by a prescribed extent so as suppress the knocking.

5 Claims, 3 Drawing Sheets

IGNITION TIMING CONTROL APPARATUS FOR A MARINE ENGINE

BACKGROUND OF THE INVENTION

The present invention relates to an ignition control apparatus for an engine which is particularly suitable !or controlling ignition timings of a marine engine.

FIG. 4 shows a circuit diagram of a conventional ignition control apparatus for a marine engine. The conventional ignition control apparatus illustrated includes a generator coil 101 of a magneto generator which generates an alternating current output in synchrony with the rotation of an engine, a rectifier diode 102 for rectifying the alternating current output of the generator coil 101, a capacitor 103 which is charged by the output of the generator coil 101 through the rectifier diode 102, an ignition coil 104 having a primary winding connected to the capacitor 103 and a secondary winding, a spark plug 105 connected to the secondary winding of the ignition coil 104 so as to generate a spark when a high voltage develops across the secondary winding, a thyrister 106 for controlling the ignition coil 104, &he thyrister 106 having an anode connected to a junction between the rectifier diode 102 and the capacitor 103, a cathode connected to ground and a control gate for controlling the conduction of the thyrister 106, and a pick-up coil 107 connected to the control gate of the thyrister 106 through a rectifier diode 108 and a resistor 109 for periodically generating an ignition signal at a predetermined piston position of a cylinder in synchrony with the rotation of the engine so as to control the thyrister 106.

In operation, as the engine operates, the generator coil 101 generates an alternating current output which, after being rectified by a rectifier diode, is supplied to the capacitor 103 so as to charge it. When the thyrister 106 is made conductive by an ignition signal which is generated by the pick-up coil 107 and supplied to the control gate of the thyrister 106, the charged capacitor 103 discharges through the now conductive thyrister 106 so that a high voltage is developed on the secondary winding of the ignition coil 104, causing the spark plug 105 to electrically spark.

With the conventional ignition control apparatus for a marine engine as described above, the thyrister 106 is directly controlled by the output signal of the pick-up coil 107 alone, and no means is provided for calculating and controlling optimal ignition timings on the basis of the operating condition of the marine engine. Thus, it is impossible to change the ignition timing in accordance with the operating condition of the marine engine, so it is difficult to concurrently control both the startability and the idling property during the trolling (low-speed) operation of the engine in a proper manner.

SUMMARY OF THE INVENTION

Accordingly, the present invention is intended to obviate the above-mentioned problem of the conventional ignition timing control apparatus An object of the present invention is to provide an improved ignition control apparatus for a marine engine which is able to improve the startability and the idling property at low speeds of the engine Another object of the present invention is to provide an improved ignition timing control apparatus for a marine engine which is relatively simple in construction and inexpensive to manufacture According to the present invention, there is provided an ignition control apparatus for a marine engine comprising:
- an ignition coil connected to a spark plug for a cylinder;
- power supply means for supplying a current to the ignition coil;
- a switch element for switching on and off the conduction between the power supply means and the ignition coil so as to develop a high voltage on the ignition coil; and
- an ignition timing controller for controlling the switch element so as to properly change the ignition timing of the cylinder depending upon the operating condition of the engine, the controller being operable to retard the ignition timing of the cylinder from a reference ignition timing suitable for engine starting to a first retard ignition timing by a prescribed extent when the number of revolutions per minute of the engine exceeds a predetermined level.

Preferably, the ignition timing controller comprises:
- a pick-up coil generating an output signal indicative of a reference piston position of the cylinder;
- an engine speed detection circuit for calculating the number of revolutions per minute of the engine based on the output signal of the pick-up coil and for generating an output signal when the number of revolutions per minute of the engine exceeds a prescribed level;
- an ignition timing calculation circuit for calculating, based on the output signal of the pick-up coil, the first retard ignition timing for the normal and stable engine operation; and
- an ignition timing switching circuit for changing, based on the output of the engine speed detection circuit, the ignition timing of the cylinder from the reference ignition timing to the first retard ignition timing when the number of revolutions per minute of the engine exceeds the predetermined level.

The ignition timing controller may further comprise:
- a knock sensor for sensing knocking in the cylinder and generating an output signal when knocking takes place; and
- a knock control circuit for controlling the ignition timing calculation circuit based on the output signal of the knock sensor so as to suppress the knocking in the cylinder, the knock control circuit being operable to change the ignition timing of the cylinder to a second retard ignition timing which retards from the first retard ignition timing by a prescribed extent when the knock sensor senses knocking in the cylinder Preferably, the ignition timing switching circuit comprises a normal ignition control starting switch circuit for interrupting the supply of the output signals of the pickup coils to the switch elements while permitting the supply of the ignition timing signal of the ignition timing calculation circuit to the switch elements when the number of revolutions per minute of the engine exceeds the prescribed level The ignition timing switching circuit ma further comprise a timer for actuating the normal ignition control starting switch circuit when a predetermined time has elapsed after the engine starts to operate.

According to the present invention, during the engine starting period in which the number of revolutions per minute of the engine is relatively low or less than the Predetermined level, the ignition of the cylinder is controlled to take place at an optimum ignition timing (i.e., at the reference ignition timing) suitable for engine starting. On the other hand, when the number of revolutions per minute of the engine exceeds the predetermined level, the star control circuit operates to change the ignition timing to the first retard ignition timing so as to provide for normal and stable engine operation. Further, if knocking occurs in a cylinder, the knock control circuit operates to change the ignition timing to the second retard ignition timing so as to suppress such knocking The above and other objects, features and advantages of the present invention will become apparent from the following detailed description of a preferred embodiment of the invention taken in conjunction with the accompanying drawings

DESCRIPTION OF THE PREFERRED EMBODIMENT

The present invention will now be described in detail with reference to a preferred embodiment thereof as illustrated in the accompanying drawings.

Figure 1:
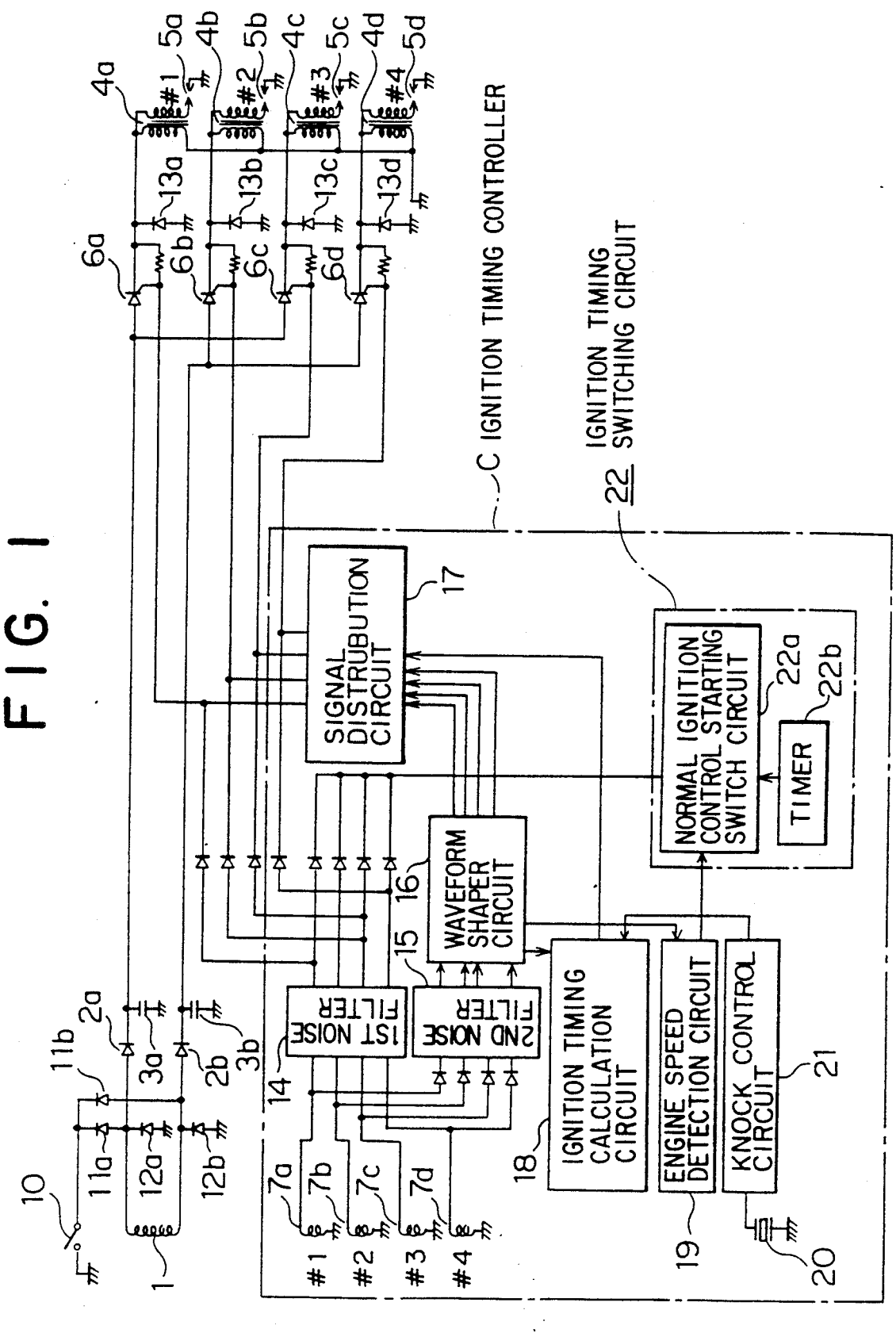
FIG. 1 is a schematic circuit diagram of an ignition control apparatus for a marine engine according to the present invention.

Referring first to FIG. 1, there is diagrammatically illustrated an ignition control apparatus for a marine engine having a plurality of (e.g., four in the illustrated embodiment) cylinders according to the present invention The apparatus illustrated includes: a plurality of ignition coils 4a through 4d each connected to a corresponding spark plug 5a through 5d for a corresponding cylinder; power supply means 1 in the form of a generator coil of a magneto generator for supplying a current to the respective ignition coils 4a through 4d; a plurality of switch elements 6a through 6d in the form of thyristers for switching on and of the conduction between the generator coil 1 and the ignition coils 4a through 4d so as to develop a high voltage on each ignition coil 4a through 4d; and an ignition timing controller C for controlling the switch elements 6a through 6d so as to properly change the ignition timing of each cylinder depending upon the operating condition of the engine. The controller C operates to retard the ignition of each cylinder from a reference ignition timing suitable for engine starting to a first retard ignition timing suitable for normal and stable engine operation when the number of revolutions per minute of the engine exceeds a predetermined level.

Specifically, the generator coil 1 has one end connected to the first and third ignition coils 4a, 4c for the first and third cylinders through a first common rectifier diode 2a and the first thyrister 6a and the third thyrister 6c, respectively, and it has the other end connected to the second and fourth ignition coils 4b. 4d for the second and fourth cylinders through a second common rectifier diode 2b and the second thyrister 6b and the fourth thyrister 6d, respectively. A first capacitor 3a has one end connected to the cathode of the first rectifier diode 2a and the other end grounded so that it is charged by the output current of the generator coil 1 which has been rectified into a positive direct current by the first rectifier diode 2a. Likewise, a second capacitor 3b has one end connected to the cathode of the second rectifier diode 2b and the other end grounded so that it is charged by the output current of the generator coil 1 which has been rectified into a positive direct current by the second rectifier diode 2b. The opposite ends of the generator coil 1 are further connected to ground through a diode 12a and a diode 12b, respectively, and to the positive terminal of a normally open common stop switch 10 through a diode 11a and a diode 11b, respectively, the negative terminal of the stop switch 10 being connected to ground. The stop switch 10 is closed when the engine stops, and it is opened when the engine operates. A first through a fourth diode 13a through 13d have a cathode connected to one end of the corresponding first through fourth ignition coil 4a through 4d, respectively, and an anode connected to ground.

Figure 3:
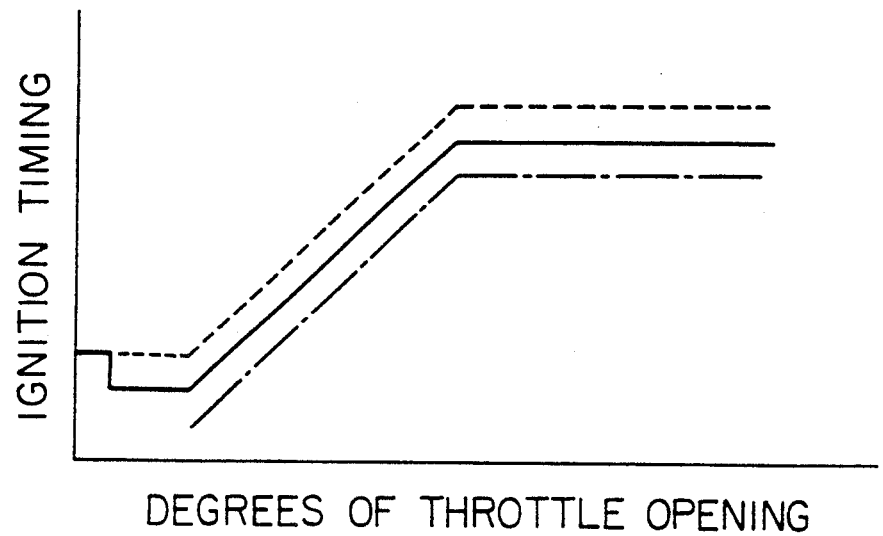
FIG. 3 is a graphic representation of the ignition timing characteristics of the ignition control apparatus of FIG. 1, wherein the broken line, the solid line and the dash-and-dot line indicate the relationship between the ignition timing and the degree of throttle opening during the engine starting period, during the static engine operation, and during the knocking period, respectively.
Figure 4:
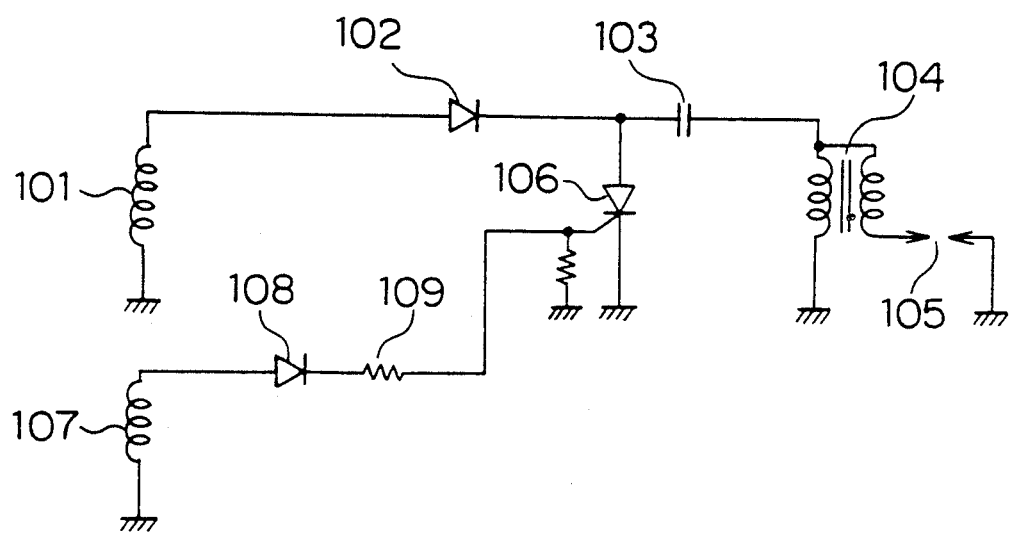
FIG. 4 is a circuit diagram of a conventional ignition control apparatus for a marine engine.

The ignition timing controller C comprises: a plurality of pick-up coils 7a through 7d each generating an output signal indicative of a reference piston position (i.e., a reference ignition timing which is indicated by the broken line in FIG. 3) of a corresponding cylinder to a corresponding thyrister 6a through 6d; an engine speed detection circuit 19 for calculating the number of revolutions per minute of the engine based on the output signals of the pick-up coils 7a through 7d and generating an output signal when the number of revolutions per minute of the engine exceeds a prescribed level; an ignition timing calculation circuit 18 for calculating, based on the output signals of the pick-up coils 7a through 7d, the normal or first retard ignition timing for each cylinder which retards from the reference ignition timing of a corresponding pick-up coil signal by a prescribed extent, as shown by the solid line in FIG. 3; and an ignition timing switching circuit 22 for changing, based on the output of the engine speed detection circuit 19, the ignition timing of each cylinder from the reference ignition timing to the first retard ignition timing when the number of revolutions per minute of the engine exceeds the predetermined level.

Each of the pick-up coils 7a through 7d has one end grounded and the other end connected through a first noise filter 14 and a rectifier diode to the control gate of corresponding thyristers 6a through 6d, and at the same time to a signal distribution circuit 17 through a rectifier diode, a second noise filter 15 and a waveform shaper circuit 16 which functions to shape the waveform of the noise-filtered output signal (e.g., in the form of a sinusoidal pulse) of each pick-up coil into an appropriate form (e.g., a square form). The outputs of the waveform shaper circuit 16 are also supplied to the ignition timing calculation circuit 18 and the engine speed detection circuit 19. The ignition timing calculation circuit 18 calculates, based on the outputs of the waveform shaper circuit 19, the first retard ignition timing for each cylinder and generates an ignition timing signal to the signal distribution circuit 17 which then distributes, based on the output signals of the waveform shaper circuit 16 (i.e., the waveform shaped output signals of the pick-up coils 7a through 7d), the ignition timing signal to the control gates of the thyristers 6a through 6d so as to turn them off at respective appropriate timings.

Figure 2:
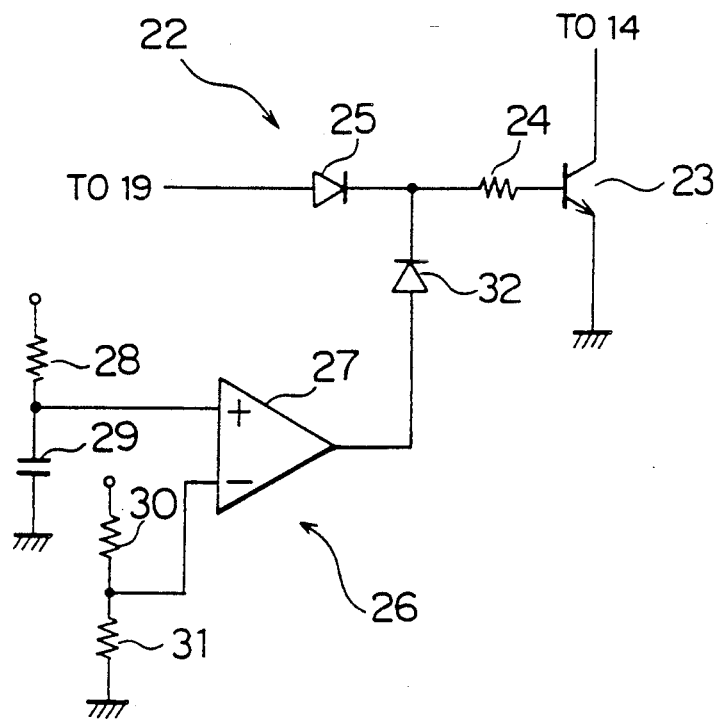
FIG. 2 is a circuit diagram of a start control circuit of FIG. 1.

As clearly shown in FIG. 2, the ignition timing switching circuit 22 includes a normal ignition control starting switch circuit 23 in the form of a transistor which has a base connected via a resistor 24 and a rectifier diode 25 to the output terminal of the engine speed detection circuit 19, a collector commonly connected to the outputs of the first noise filter 14, and an emitter grounded. A timer circuit 26 is connected to the base of the transistor 23 for turning it on when a Prescribed time has elapsed from the starting of the engine e.g., from the instant when the stop switch 10 is opened. The timer circuit 26 comprises a comparator 27 having a first positive input terminal connected to a junction between a resistor 28 and a capacitor 29 which are series connected between a power supply and ground, a second negative input terminal connected to a junction between a first and a second resistor 30, 31 which are series connected between a power supply and ground, and an output terminal connected through a diode 32 to a node between the diode 25 and the resistor 24. When the capacitor 29 is charged to a voltage level which exceeds a reference voltage level imposed on the second negative input terminal, the comparator 27 begins to generate an output which is fed to the base of the transistor 23 and turns it on. When the transistor 23 is turned on to start conducting, the outputs of the first noise filter 14 are short-circuited to ground through the now conductive transistor 23.

The ignition timing controller C further includes a plurality of knock sensors 20 (only one is illustrated) each sensing knocking in a corresponding cylinder and generating an output signal when knocking occurs, and a knock control circuit 21 or controlling the ignition timing calculation circuit 18 based on the output signals of the knock sensors 20 so as to suppress knocking in each cylinder. When a knock sensor 20 senses knocking in a cylinder, the knock control circuit 21 operates to change the ignition timing of the knocking cylinder to a second retard ignition timing, as shown by the dash-and-dot line in FIG. 3, which retards from the first retard ignition timing by a prescribed extent.

The above-described embodiment operates as follows.

First, the stop switch 10 is opened before the engine is started. Then, as the engine operates, the generator coil 1 generates an alternating current which, after being rectified into a positive direct current by the rectifier diodes 2a, 2b, is supplied to the first and second capacitors of respective thyristers 6a through 6d.

The output signals of the waveform shaper circuit 16 are also input to the ignition timing calculation circuit 18 which calculates, based thereon, an optimal ignition timing (i.e., a first retard ignition timing) suitable for the normal and stable operation of each cylinder, which retards from the reference ignition timing given by each pick-up coil, as indicated by the solid line in FIG. 3.

Further, the output signals of the waveform shaper circuit 16 are also input to the engine speed detection circuit 19 which calculates, based thereon, the number of revolutions per minute of the engine.

When the engine speed calculation circuit 19 detects that the number of revolutions per minute of the engine is equal or greater than a prescribed level, it generates an output signal to the ignition timing switching circuit 22 whereby the transistor 23 is turned on, short-circuiting the output signals of the first noise filter 14 to ground through the now conductive transistor 23. Thereafter, the thyristers 6a through 6d are controlled by the ignition timing signal of the ignition timing calculation circuit 18 which is distributed thereto by the signal distribution circuit 17. As a result, the spark plugs 5a through 5d are caused to spark at prescribed normal or first retard ignition timings, as indicated by the solid line in FIG. 3, which are calculated by the ignition timing calculation circuit 18, the prescribed normal ignition timings being later a prescribed extent than the reference ignition timings given by the pick-up coils 7a through 7d.

In addition, if knocking takes place in a cylinder, a corresponding knock sensor 20 senses such knocking and generates a knock signal to the knock control circuit 21 which in turn controls the ignition timing calculation circuit 18 in such a manner that an ignition timing signal indicative of a second retard ignition timing is thereby generated, as indicated by the dash-and-dot line in FIG. 3, thus retarding the ignition timing of the knocking cylinder by a prescribed extent. i.e., from the normal ignition timing for normal and stable engine operation to the second retard ignition timing which is effective to suppress the knocking.

What is claimed is:

1. An ignition timing control apparatus for a marine engine comprising:

an ignition coil connected to a spark plug for a cylinder;

power supply means (1-3) for supplying a current to said ignition coil;

a switch element (6) for switching on and off the conduction between said power supply means and said ignition coil so as to develop a high voltage on said ignition coil; and an ignition timing controller (C) for controlling the conduction of said switch element to properly change the ignition timing of the cylinder depending upon a detected operating condition of the engine, said controller being operable to continuously retard the ignition timing of the cylinder from a reference ignition timing suitable for initial engine startup to a first retarded ignition timing differing from reference ignition timing by a prescribed extent whenever the number of revolutions per minute of the engine exceeds a predetermined level, said first retarded ignition timing being suitable for normal and stable engine operating speeds.

2. An ignition timing control apparatus according to claim 1, wherein said ignition timing controller comprises:

a pick-up coil (7) generating an output signal indicative of a reference piston position of the cylinder;

an engine speed detection circuit (19) for calculating the number of revolutions per minute of the engine based on the output signal of said pick-up coil and for generating an output signal when the number of revolutions per minute of the engine exceeds a prescribed level;

an ignition timing calculation circuit (18) for calculating, based on the output signal of said pick-up coil, the first retarded ignition timing for the normal and stable engine operation; and an ignition timing switching circuit (22) for changing, based on the output of said engine speed detection circuit, the ignition timing of the cylinder from the reference ignition timing to the first retarded ignition timing when the number of revolutions per minute of the engine exceeds the predetermined level.

3. An ignition timing control apparatus according to claim 2, wherein said ignition timing controller further comprises:
  a knock sensor (20) for sensing knocking in the cylinder and generating an output signal when knocking takes place; and
  a knock control circuit (21) for controlling said ignition timing calculation circuit based on the output signal of said knock sensor so as to suppress the knocking in the cylinder, said knock control circuit being operable to change the ignition timing of the cylinder to a second retarded ignition timing which exceeds the first retarded ignition timing by a prescribed extent when said knock sensor senses knocking in the cylinder.

4. An ignition timing control apparatus according to claim 2, wherein said ignition timing switching circuit comprises a normal ignition control starting switch circuit (22a) for interrupting the supply of the output signals of said pick-up coils to said switch elements while permitting the supply of the ignition timing signal of said ignition timing calculation circuit to said switch elements when the number of revolutions per minute of the engine exceeds the prescribed level.

5. An ignition timing control apparatus according to claim 4, wherein said ignition timing switching circuit further comprises a timer (22b) for actuating said normal ignition control starting switch circuit when a predetermined time has elapsed after the engine starts to operate.

* * * * *